United States Patent Office 3,754,039
Patented Aug. 21, 1973

3,754,039
BICYCLIC ETHERS OF THE CYCLODODECANE SERIES
Peter Nageli, Unter-Ehrendingen, Switzerland, assignor to Givaudan Corporation, Clifton, N.J.
No Drawing. Filed Dec. 30, 1970, Ser. No. 102,978
Int. Cl. C07c 43/18
U.S. Cl. 260—611 F                 5 Claims

ABSTRACT OF THE DISCLOSURE

There are provided novel bicyclo [10.1.0] tridec-1-yl alkyl ethers which possess woody amber like odors and are useful in the perfume arts on the basis of their odors and fixative properties.

FIELD OF THE INVENTION

Novel odoriferous bicyclic ethers.

RELATED APPLICATIONS

This application claims priority from applicant's Swiss application 515/70, filed Jan. 15, 1970.

DESCRIPTION OF THE PRIOR ART

Certain derivatives of cyclo dodecane are known to have odorant properties. Ethyl 4,8-cyclo dodecadiene-1-carboxylate has a woody, vetiver oil-like odor (DAS 1,223,974 to Procter and Gamble). Ketals of cyclododecanone possess odors reminiscent of cedar and sandalwood with musk and ambrette notes (Swiss Pat. 435,521 to Haarmann and Reimer) and certain ethers of cyclododecanol possess cedar and musk odors. (Swiss Pat. 443,536 to Haarmann and Reimer.)

While bicyclo [10.1.0] tridecane derivatives have been prepared (see Pharham and Sperley, J. Org. Chem. 32 924 (1967)) the 13-alkyl-1-ether derivatives have not been prepared heretofore and nothing was heretofore known about the odor properties of this class of compounds.

The present invention is concerned with novel bicyclic ethers of the cyclododecane series of the general formula

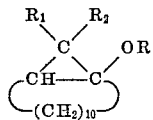

(I)

wherein R signifies an alkyl group containing 1-4 C-atoms (such as methyl, ethyl, propyl, isopropyl, normal or branched butyl) and $R_1$ as well as $R_2$ independently of each other signify hydrogen, methyl or ethyl.

The compounds of General Formula I are distinguished by particular odor properties (warm-woody, amber- to musk-like notes with good adhesion) on the basis of which they can be used for perfumery purposes such as manufacture of perfumes or for perfuming products of all kinds such as cosmetic articles (soaps, powders, creams, lotions etc.). The content of compounds of General Formul I in odorant compostions is governed by the intended use and can vary within wide limits, for example between 0.005–30 wt. percent.

The compounds of General Formula I can be obtained by
  (a) Adding to the olefinic double bond of a compound of the general formula

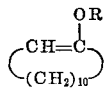

(II)

wherein R signifies the same as above, a group of the general formula

(III)

wherein $R_1$ and $R_2$ signfy the same as above, or by
  (b) Replacing the halogen atoms of a compound of the general formula

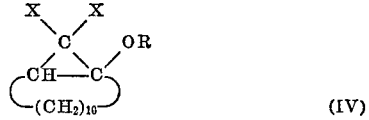

(IV)

wherein R has the above significance and X signifies a halogen atom (especially chlorine or bromine), by hydrogen, methyl or ethyl.

The processes of the present invention may be schematically summarized as follows:

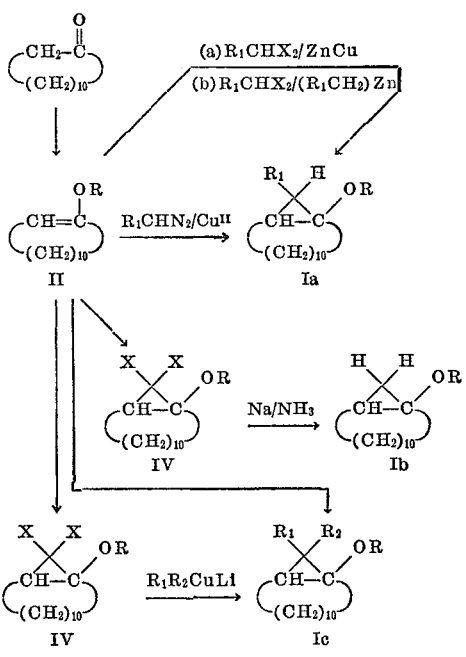

(a) where $R_2=R$
(b) where $R_1$ and $R_2=H$

DESCRIPTION OF THE PREFERRED EMBODIMENTS

Several modifications of general process (a) involving addition across the double bond of an enol ether are available.

In one mode of the enol ether (II) is reacted with a methylidene or ethylidene halide such as the iodide in the presence of a zinc/copper couple by heating under reflux in a solvent. It is preferred to use a slight excess of the halide in the enol ether, an excess of about 10 mole percent is satisfactory, a similar amount and excess of zinc copper couple are also preferably utilized. The reaction mixture is taken up in a suitable solvent, preferably a slightly polar non-hydroxylic solvent- such as diethylether and heated under reflux until an exothermic reaction is noted (ca. 30–60 minutes). The heat source is removed and the mixture stirred at ambient temperature for from about 10 to about 20, suitably fo about 15 hours and the metallic residue removed, suitably by filtration. The solution is worked up in the usual manner to yield the desired compound (Ia) where $R_1$ is hydrogen or methyl (see R. D. Smith and H. E. Simmons Org. Synth. 41 72 (1961)).

In another modification the enol ether (II) is reacted with a bis haloalkyl zinc preferably in the concentrated solution in a solvent, preferably in the presence of a zinc halide catalyst. Depending on the product desired there may be utilized bis halomethyl-, bis haloethyl- or bishalopropylzinc. Among the aforementioned groups, bisiodomethyl zinc gives the most satisfactory results (Ib). There is utilized an excess of olefin (the unreacted portion being recovered) a ratio of between 1 and 4 moles of olefin per mole of bis iodomethyl zinc being preferred. While the reaction will take place at ambient temperature it is preferred to warm the reaction mixture for from 2–5 hours at between 30–40° C. in a small amount of a solvent such as ether.

The yield of product is substantially enhanced by the addition of the corresponding zinc halide, from about 3 to about 6 moles of zinc halide per mole of bis haloalkyl zinc may be usefully employed. The desired product is isolated by fractional distillation of the reaction product (see Wittig et al. Ber. 97, 2146, (1964)).

In another modification compound Ia ($R_2$=H, $R_1$=$CH_3$) may be prepared by reacting compound (II) with ethylidene iodide in the presence of diethyl zinc. In the process compound (II) and a moderate excess such as 5 to 30 suitably a 25% molar excess of diethyl zinc in a reaction inert solvent, suitably a hydrocarbon solvent such as petroleum ether is agitated in an inert atmosphere at ambient temperature a substantial excess, say a 1 to 1.5 molar excess of ethylidene iodide, is slowly added, the mixture allowed to stand for from about 5 to about 12 hours at ambient temperature, the mixture is then quenched with dilute aqueous acid and the product extracted in the usual manner (Nishimura et al., Tetrahedron 25, 2647 (1969)).

In yet a further embodiment of this modification of the process, the enol ether (II) is treated with an ethereal solution of an appropriate diazoalkane in the presence of cupric ion. In this process, the enol ether (II), is mixed with a catalytic amount, suitably between about 5 and about 10 weight percent of anhydrous cupric salt suitably anhydrous cupric sulfate and cooled, suitably to ice-bath temperatures. There is then slowly added thereto, a substantial excess of the appropriate diazoalkane for example diazomethane, diazoethane or diazopropane, in ethereal solution. The rate of addition is controlled to maintain the reaction mixture at ice-bath temperatures, but after addition is complete the mixture is allowed to stand, with agitation, at ambient temperatures. The reaction mixture is then worked up in the usual manner. (The diazoalkanes are prepared in accordance with the method of Wilds et al. J. Org. Chem. 13,, 770 (1948)).

The general process modification (b) may be carried out by replacement of the gem-dihalo starting material halogens with hydrogen, methyl or ethyl. The appropriate enol-ether (II) is converted into the corresponding 13,13-dihalo-bicyclo[10.1.0]tridec-1-yl ether by reaction with either chloroform or bromoform in accordance with the method set forth in Parham and Sperley (J. Org. Chem. 32, 924 (1967)).

The reduction of the gemhalogen atoms to yield the corresponding bicyclo[10.1.0]tridec-1-yl ether (I) may be achieved either by reduction with nascent hydrogen or by a chemical reduction.

In the first mode the source of nascent hydrogen should be generated in a basic medium. Thus, an alkali metal such as sodium, potassium, or lithium in liquid ammonia may be employed, or one of these metals in an alkanol suitably a lower alkanol, preferably sodium or potassium in ethanol may be used. Alternatively, other reduction may be achieved with trialkyltinhydride or electrolytic reduction in a basic medium. Especially preferred is the reduction employing sodium in liquid ammonia.

The sodium and liquid ammonia reduction is carried out by preparing a solution of sodium in dry liquid ammonia. It is desirable to use a substantial excess of sodium suitably an excess of the order of from about 5 to about 7 moles of sodium per mole of dihalo ether (IV). The liquid ammonia solution is held to a temperature of from about −40 to about −50° C. and the dihalo ether (IV) is added slowly thereto. After addition is complete, the mixture is agitated for about 1 hour, and the excess alkali metal neutralized by careful addition of pulverized ammonium chloride. The quenched reaction mixture is stirred for a further hour, the ammonia permitted to evaporate, and the desired product isolated by work-up in the usual manner.

Alternatively, the dihalo compound (IV) may be reacted in such a manner as to substitute the halo atoms by an alkyl group to give a compound of General Formula Ic. In this mode the reagent utilized is a lithium dialkyl copper which is obtained by reacting the appropriate alkyl lithium with cuprous iodide in a molar ratio of 2:1.

In this modification of the process an ethereal solution of the appropriate alkyl lithium suitably methyl lithium or ethyl lithium is added under an inert atmosphere to a suspension of cuprous iodide in dry ethyl ether. Upon conversion of the suspension to a solution, the solution is cooled to from about −10 to about +5° C. suitably to about −5 to 0° C. and an ethereal solution of the dihalo-preferably the dibromo-bicyclo[10.1.0]tridec - 1 - yl ether in ethyl ether added slowly thereto. After completion of the addition, the reaction mixture is stirred for from about 8 to about 12 hours at ambient temperature, and quenched by pouring into a cold, aqueous solution of ammonium chloride. The resultant mixture is exhaustively extracted with ether, and the desired product isolated therefrom by fractional distillation in the usual manner.

As stated hereinabove, the novel odorant compositions produced in accordance with the present invention which have excellent fixative properties, may be utilized in a wide range of proportions in compositions containing them. Preferably, however, they are utilized in amounts ranging from about 0.5 to about 20% by weight in the compositions comprising them. And, for example, when utilized for the perfuming of soaps, between 1 and 2% by weight of such perfume compositions will suffice. In compositions such as lotions, suitably hand lotions and the like, from between 2 to about 3% by weight of such compositions are utilized and in bath salts and essences, depending on the type of composition, between 0.3 and 5% by weight of the composition are utilized. It should be noted that a rather special interest among the novel odorant compounds of the present invention is bicyclo[10.1.0]tridec-1-yl-methyl ether having a woody-warm amber-like odor.

In the following examples all temperatures are in degrees centigrade (° C.).

Example I (a) 9.8 g. of zinc-copper alloy (see Organic Syntheses, vol. 41 (1961), 72) are stirred with a few crystals of iodine for ca. 15 minutes in 100 ml. of absolute ether until the iodine color disappears. 9.86 g. of 1-methoxy-1-cyclododecene and 40.2 g. of freshly distilled methylene iodide are thereupon rapidly added. The mixture is heated under reflux in nitrogen atmosphere with good stirring for 48 hours. Filtration from the residue, rinsing thereof with a large amount of ether, thereupon washing of the combined ether phases three times with saturated ammonium chloride solution and subsequently with saturated bicarbonate solution give, after drying and concentration, 11 g. of a product which is distilled at 80°/0.001 mm. Hg, $n_D^{20}$ 1.4825–1.4830.

Analysis.—Calcd. (percent): C, 79.33; H, 12.46. Found (percent): C, 80.09; H, 12.52.

The bicyclo [10.1.0]tridec-1-yl methylether thus obtained (Formula I: R=$CH_3$, $R_1$=H, $R_2$=H) is distinguished by a woody, warm, amber-like odor note.

$IR_{Film}$: 1468, 1445, 1253, 1239, 1215, 1210, 1090, 1080, 1070, 995 cm.$^{-1}$ NMR$_{CDCl_3}$: s[3H] at δ=3.22 p.p.m. cyclopropyl hydrogen between δ=0.2 p.p.m. and 1.1 p.p.m.

(b) The 1-methoxy-1-cyclododecene used as the starting material can be manufactured as follows:

182 g. of cyclododecanone and 117 g. of orthoformic acid trimethyl ester are heated with stirring to 40° until a clear yellowish solution exists. 1 ml. of conc. sulphuric acid is thereupon added dropwise and the mixture is immediately cooled to 20°. The solution is subsequently stirred at room temperature for a further 15–20 hours. After the addition of 3 ml. of triethylamine, the product is fractionated in vacuum. Yield of 1-methoxy-1-cyclododecene: over 90%.

Example II

According to the process described in Example I or in the following Example III, but using 1-ethoxy-1-cyclododecene as the starting material, there is obtained bicyclo [10.1.0]tridec-1-yl ethylether.

*Analysis.*—Calcd. (percent): C, 80.29; H, 12.80. Found (percent): C, 80.22; H, 12.70. B.p. 90°/0.01 mm. Hg.

IR$_{Film}$: 1470, 1445, 1120, 1090, 1080, 1070, 1060, 945 cm.$^{-1}$

NMR$_{CDCl_3}$: m(2H) at δ=3.0–3.99 p.p.m.; t(3H, J=7 c.p.s.) at δ=1.07 p.p.m.; cyclopropane hydrogen between δ=−0.2—0.4 p.p.m.

The odor of this product displays the woody/amber-like note of the methyl ether described in Example I, but is somewhat weaker.

Example III 400 ml. of an ethereal diazoethane solution (manufactured according to A. L. Wilds et al., J. Org. Chem. 13 (1948) 770) are added dropwise within 30 minutes with ice-cooling and stirring to 16.6 g. of 1-methoxy-1-cyclododecene and 1 g. of anhydrous copper (II) sulphate. Overnight, the mixture is further stirred at room temperature. The ethereal solution is then dried with a little anhydrous magnesium sulphate, filtered and evaporated. The resulting oily crude product (17.9 g.) is chromatographed on the 50-fold amount by weight of silica gel. The desired product is eluted with benzene and further purified by preparative gas chromatography. The odor of the 13-methyl-bicyclo [10.1.0]tridec-1-yl methyl ether (Formula I: R=CH$_3$, R$_1$=H, R$_2$=CH$_3$) thus obtained is weakly woody, musk-like.

IR$_{Film}$: 1470, 1445, 1270, 1250, 1230, 1215, 1078, 1000 cm.$^{-1}$

NMR$_{inC_6D_6}$: s[3H] at δ=3.2 p.p.m. d[3H] at δ=1.20 p.p.m. cyclopropyl H at δ=0.05 to 1.0 p.p.m.

Example IV (a) A solution of 94 g. of 13,13-dichloro-bicyclo-[10.1.0]tridec-1-yl methyl ether in 500 ml. of abs. ether is slowly added dropwise at −40° to −50° to 47 g. of sodium dissolved in 1 litre of liquid dry ammonia. After completed addition, the mixture is further stirred for an hour at this temperature, then 168 g. of ammonium chloride (pulverized) are introduced portionwise. After stirring for ca. 1 hour, the ammonia is evaporated off and ca. 1 litre of water is added to the residue. This is subsequently exhaustively extracted with hexane, the hexane phases are washed neutral and dried in conventional manner. After evaporation of the hexane solution, the bicyclo [10.1.0]tridec-1-yl methyl ether obtained is fractionated in vacuum. B.P.: 85°/0.2 mm. Hg. Yield: 36 g. $n_D^{20}$=1.4825–1.4830.

(b) The 13,13 - dichloro-bicyclo[10.1.0]tridec-1-yl methyl ether used as the starting material can be obtained as follows:

448 g. of ground potassium hydroxide are mixed with 1.2 litres of absolute 1,2-dimethoxyethane. 80 g. of 1-methoxy-1-cyclododecene are added to the mixture and then 480 g. of chloroform are added dropwise in the course of 8 or more hours with good stirring and with cooling to −15 to −5°. After the reaction has subsided, the crude mixture is poured onto ca. 1 kg. of ice and treated with 20% hydrochloric acid up to the neutral point. The product is thereupon filtered off through a filter aid, the filter cake rinsed with 500 ml. of hexane and the filtrate extracted twice with 500 ml. of hexane. The hexane phases are washed with water, dried with sodium sulphate and, after filtration, allowed to run through 230 g. of silica gel (0.3 mm.). After evaporation of the hexane eluates, there are obtained 95 g. of 13,13-dichloro-bicyclo-[10.1.0]tridec-1-yl methyl ether (Formula IV: R=CH$_3$, X=Cl) in a yield of ca. 83%.

Example V (a) 50 ml. of a 1.47 molar ethereal solution of methyl lithium is added under a nitrogen atmosphere to 5.7 g. of copper [I] iodide in 50 ml. of abs. ether. After the sediment has gone into solution, a solution of 13,13- dibromo bicyclo[10.1.0]tridec-1-yl methyl ether in 100 ml. of abs. ether is added dropwise at −5° to 0°. The formation of a yellow precipitate is observed.. After completion of the addition, the reaction mixture is stirred overnight at room temperature, thereupon poured into ice cold 20% ammonium chloride solution and exhaustively extracted with ether. After the usual washing neutral with water and drying with magnesium sulphate, after evaporating off the solvent there remain 6 g. of a brown oil which is chromatographed on the 80-fold amount by weight of Florisil. By elution with hexane/benzene mixtures there is obtained the desired 13,13-dimethyl-bicyclo-[10.1.0]tridec-1-yl methyl ether which is distilled at 80°/0.001 mm. Hg. The odor is weakly woody.

IR$_{Film}$: 1475, 1450, 1375, 1086 cm.$^{-1}$

NMR$_{CDCl_3}$: s[3H] at δ=3.25 p.p.m. 2 s [each 3H] at 1.18 p.p.m. and 0.92 p.p.m., m [1H] at δ=0.3 to 0.7 p.p.m.

(b) The 13,13 - dibromo-bicyclo[10.1.0]tridec-1-yl methyl ether used as the starting material can be obtained in ca. 70% yield in the manner described in Example III(b), with the substitution of the chloroform by bromoform.

Example VI

Composition (woody-earthy base) with a content of bicyclo[10.1.0]tridec-1-yl methyl ether (Formula I: R=CH$_3$, R$_1$=H, R$_2$=H).

| | Parts by weight |
|---|---|
| Hydratropaldehyde dimethyl acetal | 5 |
| Patachouli oil | 25 |
| Galbanum resinoid | 20 |
| Olibanum resinoid | 15 |
| Mousse de Chêne sol. | 10 |
| Coumarin | 10 |
| Vetiver oil bourbon | 20 |
| Methylnonylacetaldehyde (10% in phthalic acid diethyl ester) | 10 |
| Sandalwood oil East-Indian | 30 |
| Homoquinoleine (10% in phthalic acid diethyl ester) | 20 |
| Lovage oil (10% in phthalic acid diethyl ester) | 25 |
| Xylene musk | 20 |
| Bornyl acetate liquid | 40 |
| Bicyclo[10.1.0]tridec-1-yl methyl ether | 100 |
| | 350 |

I claim:
1. A compound of the general formula

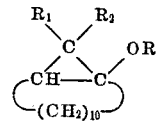

(I)

wherein R signifies an alkyl group containing 1–4 C-atoms and $R_1$ as well as $R_2$ independently of each other signify hydrogen, methyl or ethyl.

2. Bicyclo[10.1.0]tridec-1-yl methyl ether, being a compound according to claim 1.

3. Bicyclo[10.1.0]tridec-1-yl ethyl ether, being a compound according to claim 1.

4. 13-methyl-bicyclo[10.1.0]tridec-1-yl methyl ether, being a compound according to claim 1.

5. 13,13-dimethyl-bicyclo[10.1.0]tridec-1-yl methyl ether, being a compound according to claim 1.

References Cited

Parham et al.: Jour. Org. Chem., vol. 32 (1967), pp. 924–931.

BERNARD HELFIN, Primary Examiner

U.S. Cl. X.R.

252—522; 260—611 R

UNITED STATES PATENT OFFICE
CERTIFICATE OF CORRECTION

Patent No. 3,754,039          Dated August 21, 1974

Inventor(s) Peter Nageli

It is certified that error appears in the above-identified patent and that said Letters Patent are hereby corrected as shown below:

Column 1, line 4: Inventor's name is Naegeli (not Nageli).

Column 1, line 26: "cyclo dodecane" should be "cyclododecane".

Column 1, line 27: "4,8-cyclo dodecadiene-1-carboxylate", should be "4,8-cyclododecadiene-1-carboxylate".

Column 1, line 36: name is "Parham" not "Pharham".

Column 1, line 61: "Formula" not "Formul".

Column 2, line 23: "(b)$R_1CHX_2/(R_1CH_2)_2Zn$" not "(b)$R_1CHX_2/(R_1CH_2)Zn$".

Column 2, line 48: "$R_2=H$" not "$R_2=R$".

Column 5, line 2: "$\delta = -0.2$ p.p.m." not "$\delta = 0.2$ p.p.m."

Column 5, line 20: "H, 12.58" not "H, 12.80".

Column 5, line 23: "$cm.^{-1}$" not "$cm._1^-$".

Signed and sealed this 1st day of April 1975.

(SEAL)
Attest:

RUTH C. MASON
Attesting Officer

C. MARSHALL DANN
Commissioner of Patents
and Trademarks